United States Patent [19]
Bourdieu

[11] Patent Number: 5,988,288
[45] Date of Patent: Nov. 23, 1999

[54] HORSESHOE WITH RESILIENT PROPERTIES

[76] Inventor: Agustin Maria Bourdieu, Basavilbaso 1219 (P.B.), Buenos Aires, Argentina

[21] Appl. No.: 08/937,106

[22] Filed: Sep. 24, 1997

[30] Foreign Application Priority Data

Sep. 25, 1996 [AR] Argentina ................................. 338284
Jul. 31, 1997 [AR] Argentina ...................... P97 01 03463

[51] Int. Cl.⁶ ................................................... A01L 5/00
[52] U.S. Cl. .......................................................... 168/12
[58] Field of Search ................... 168/4, 12, 13, 168/28

[56] References Cited

U.S. PATENT DOCUMENTS

| 643,272 | 2/1900 | Paar | 168/13 |
| 924,790 | 6/1909 | Kane | 168/13 X |
| 2,024,265 | 12/1935 | Anderson et al. | 168/4 |
| 4,690,222 | 9/1987 | Cameron | 168/4 |
| 4,844,172 | 7/1989 | Lee | 168/13 |

Primary Examiner—Robert P. Swiatek
Attorney, Agent, or Firm—Darby & Darby

[57] ABSTRACT

A horseshoe having an excellent adherence and gripping effect over any kind of grounds, particularly rigid and hard surfaces, such as pavements, the horseshoe being at least partially encased in a resilient material.

8 Claims, 2 Drawing Sheets

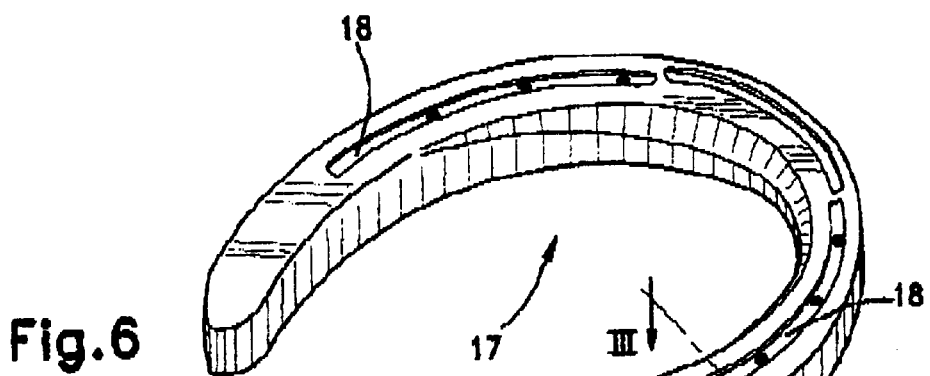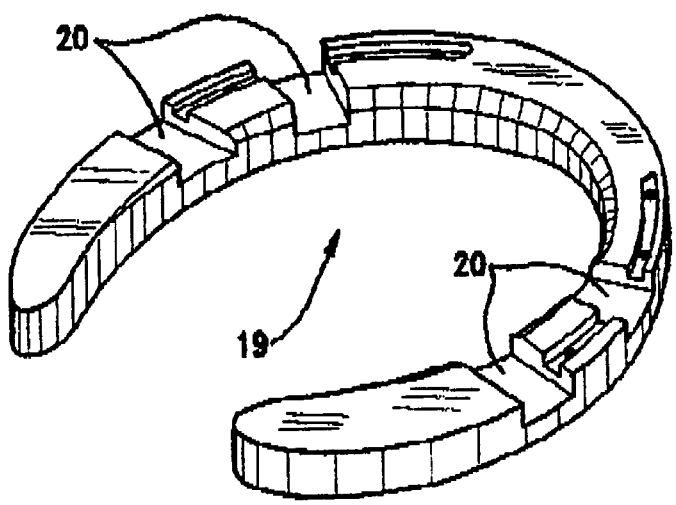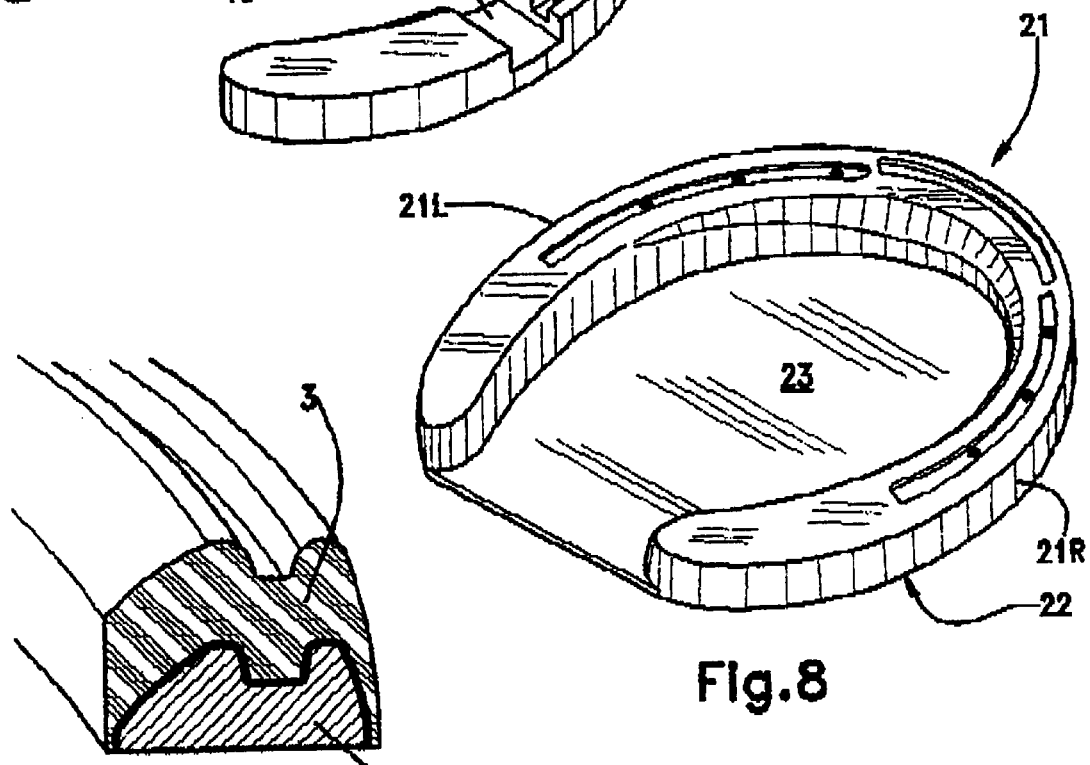

HORSESHOE WITH RESILIENT PROPERTIES

BACKGROUND OF THE INVENTION

1. Field of the Invention

The present invention relates to a new horseshoe with improved adherence and resilient properties and a method for manufacturing the same and, more particularly the invention refers to a horseshoe comprising a core piece, preferably made from metal, at least partially encased by a resilient material, preferably a rubber compound vulcanized on the core piece, the core piece including a leading sector wherein the rubber cover begins to slip from the core piece at the first stages of the use of the new horseshoe in the hoof of a horse, the leading sector being provided with means to prevent the torn out rubber cover from being propagated out of the leading sector.

To the purpose of the present specification the term "ground" means any kind of surface on which a horse wearing the horseshoe can walk or run, including soil, pavement, rocks, etc.

2. Description of the Prior Art

It is well known to provide a several types of horseshoes all made of metallic materials, preferably iron and, in special applications, made of aluminum. Although during years and years these horseshoes have been widely used with satisfactory results the same suffer from several drawbacks, particularly when the same are worn by horses that are to be used in particular applications, such as in sports or in activities in city pavements.

Particularly in the case wherein the horses have to move over rigid and hard surfaces such as pavements the conventional metal horseshoes directly transmits the impacts from the pavement onto the horse hoof with detrimental consequences to the animal. Another drawback that is widely usual when using metal horseshoes in pavements is that the horseshoe has no the necessary adherence with the pavement, thus the horseshoes does not grip enough to the pavement and the horse may easily skid over the ground and fall down with the risk of breaking a leg. The skidding risks increase when the pavement is wet due to rain, for example. This situation becomes worse when the animal is running and must suddenly stop or turn, with the result of loosing stability and falling down the floor. Horses for pavement are widely used by security forces such as police forces wherein the rider must be safe to comply with the work of to which he was appointed and the raider can not pay attention enough to the irregularities of the ground such as steps or sidewalks curbs.

In other situations such as in the practicing of sports, such polo, horse races, equitation, etc., it is necessary to count on the gripping and stability of the horse to get the better performance thereof for obtaining the best results, scores, etc. A sport horse have to run, to suddenly stop, to suddenly turn, and to have a firm grip to the ground to keep a uniform speed, particularly in horse racing, even when the animal is taking a curved and is inclined as a result of the centrifugal forces. When the horse slightly tilts upon turning along a curve of the race track the adherence to the ground, either grass, sand, soil, etc. must be optimal not only to get the higher speed but also to guarantee the jockey safety.

It would be therefore convenient to have a horseshoe that is not affected of the above mentioned drawbacks and can be safely used in any kind of surfaces such hard and rigid floors, wherein the gripping and adherence effect between the horseshoe and the ground is optimal without the horse being damaged by the continuous impacts of the hooves against the ground.

SUMMARY OF THE INVENTION

It is therefore one object of the present invention to provide a new horseshoe having an excellent adherence and gripping effect over any kind of grounds, particularly rigid and hard surfaces, such as pavements, the horseshoe being at least partially encased in a resilient material.

It is still another object of the present invention to provide a new horseshoe capable of being used in hard surfaces without transmitting the effects of the continuous impacts of the horse hoof as long as the horseshoe is encased in a resilient material capable of absorbing the impacts so as to transmit only a small portion thereof to the animal reducing enormously the risks of damages to the horse.

It is a further object of the present invention to provide a new horseshoe that includes means to assist in applying treatment substances, such as medicines, to the hoof of the horse, the means comprising a membrane formed by a resilient material at least partially covering the horseshoe extending from leg to leg of the U-shape horseshoe.

It is even another object of the present invention to provide a method for manufacturing a new horseshoe, the method comprising the steps of:

providing a horseshoe and working at least one outer surface thereof to provide the same with porosity to form an adhering surface, covering said surface with an adherence promoting substance, inserting said horseshoe within a vulcanizing die, injecting a rubber based compound within said die and vulcanizing said compound over at least said outer surface of the horseshoe, said vulcanization step being carried out for 20 minutes at a temperature of 150° C., and let the horseshoe with the rubber compound to cool.

It is a further object of the present invention to provide a new horseshoe with improved adherence and resilient properties, wherein the horseshoe comprises:

a horseshoe core piece having one upper surface to be attached to the horse hoof, a bottom surface to be in contact with the ground and side surfaces connecting said upper and bottom surfaces, said surfaces being covered by a layer comprising a rubber compound.

It is still a further object of the present invention to provide a with improved adherence and resilient properties, the horseshoe comprising a core piece having one upper surface to be attached to the horse hoof, a bottom surface to be in contact with the ground and side surfaces connecting said upper and bottom surfaces, said surfaces being covered by a layer comprising a rubber compound, the core piece having a leading sector having a step projecting out from the bottom surface of the piece, the step defining a lowermost leading surface and the layer of rubber compound recovering said lowermost surface define a thin film cover capable of being torn out during the use of the horseshoe without the tearing out of the thin film cover being propagated out of this horseshoe leading sector, the rubber layer having uniform thickness in the upper surface of the horseshoe.

The above and other objects, features and advantages of this invention will be better understood when taken in connection with the accompanying drawings and description.

BRIEF DESCRIPTION OF THE DRAWINGS

The present invention is illustrated by way of example in the following drawings wherein:

FIG. 3 shows a cross section of the inventive horseshoe along line III—III of FIG. 6;

FIG. 6 shows a perspective top view of a horseshoe having a desired outer design and including the features of the invention;

FIG. 7 shows a perspective top view of a horseshoe having another desired outer configuration and including the features of the invention.

FIG. 8 shows a perspective top view of a horseshoe for veterinary purposes and including the features of the invention.

DESCRIPTION OF THE PREFERRED EMBODIMENTS

Figure 1:
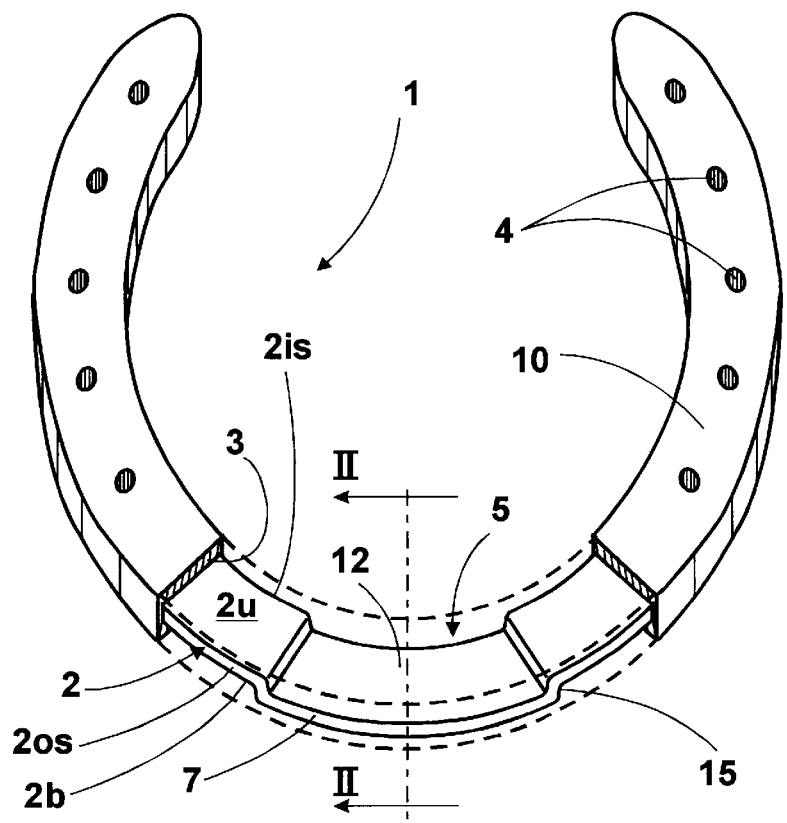
FIG. 1 shows a perspective, partially cross-sectional view of a horseshoe according to a first embodiment including the improvements of the invention.
Figure 2:
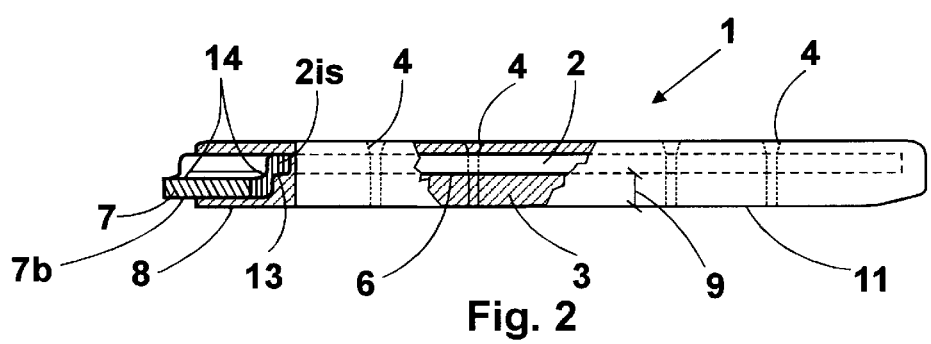
FIG. 2 shows a cross section of the inventive horseshoe along line II—II of FIG. 1.

Now referring in detail to the drawings it may be seen from FIGS. 1 and 2 a first embodiment of the inventive horseshoe indicated by means of the general reference number 1, the horseshoe comprising a rigid body or core piece 2 preferably made from metal, such as iron in most of the cases and aluminum for special applications, such as horse racing. It is to be remarked that the core piece can be made from any other suitable material such as a resin composite and other resistant plastics. Core piece is entirely or partially coated or encased by a resilient material such as a rubber based material 3, preferably a rubber vulcanized around the piece core. Piece 3 has an upper surface 2u, a bottom surface 2b and an inner side surface 2is and outer side surface 2os connecting upper and bottom surfaces 2u, 2b. The horseshoe is conventionally fixed to the hoof of the horse by passing nails through orifices 4 provided in the core piece and, according to the invention, orifices also pass through runner layer 3.

According to a remarkable feature of the invention core piece 3 has a leading sector 5, extending in approximately 50° to 100°, provided with a downwardly extending projection 7. Since the curve leading sector 5 is the sector of the horseshoe most exposed to wearing, this sector is the first one where the most rubber layer is affected and worn out, particularly in the leading legs of the horse, which legs are constantly moved against the floor when the horse is not walking or running. The several and localized impacts of the horse on the floor rapidly cause the rubber to be slipped from the core piece. Step or projection 7 defines a lowermost leading surface 7b and the layer of rubber compound recovering said lowermost surface define a thin film cover 8 that is capable of being torn out during the used of the horseshoe without the tearing out of the thin film cover being propagated out of leading bottom surface 7b. As it is shown in FIG. 2, the rubber layer 8 is very thin as compared with the thickness of layer 3 in other sections of the horseshoe, particularly on the bottom surface 2b, as indicated by numeral reference 9. The upper surface 10 of the horseshoe is adapted to be fixed to the hoof of the horse and the thickness of rubber layer 3 is uniform, except for leading section 5, as long as it is not exposed to wearing as compared to bottom surface 11 of the horse, to be in contact with the floor. To keep outer uniformity, layer 3 fully fills a recess 12 defined by the step 7.

As explained above the thickness difference between thin film cover 8 and the remaining portion 9 of the layer 3 is important to define a barrier to the tearing out of the rubber layer. When the rubber layer strips or tears out of the core piece in leading sector 5, particularly in projection or step 7, the stripped rubber layer finds a big thickness 9 and the stripping is stopped because layer 3 out of sector 5 is not so exposed to localized impacts enough to damage or strip the layer and, in addition, projection 7 operates like a barrier to absorb the most important and localized impacts and stresses. Core piece 2 may be manufactured by any known procedure, like casting, molding, stamping, forging, etc. As a construction alternative recess 12 may be fully filled by an insert (not shown), even comprising a metal different from the one of the remaining horseshoe.

Figure 4:
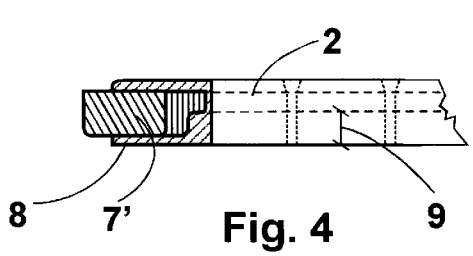
FIG. 4 shows a cross section of the inventive horseshoe, similar to FIG. 2, according to a second embodiment of the invention.
Figure 5:
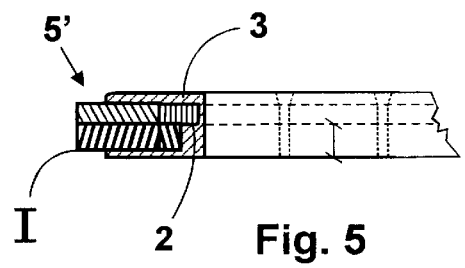
FIG. 5 shows a cross section of the inventive horseshoe, similar to FIG. 2, according to a third embodiment of the invention.

Projection 7 may be devised like an insert such as shown by 1 in FIG. 5 which may be welded or adhered by any suitable way to the bottom surface of leading sector 5'. Alternatively, core piece 2 may be manufactured by molding and sector 5 may be molded with a thickness 7' as shown in FIG. 4, thus configuring an integral piece with the remaining of the core piece. In any event, the transitions between the horizontal surfaces, the vertical surfaces and the stepped surfaces of projection 7 must be smooth to avoid any sharp edge that could be detrimental for the firm adherence of the rubber layer to the core piece.

In a simplest embodiment of the invention, core piece 2 may have a uniform and constant thickness, as shown in FIG. 5, wherein leading sector 5' does not provide the step or projection shown in FIGS. 1–4. This embodiment provides for excellent resilient and shock absorbing properties but the usual lifting and knocking movements made by the leading legs of the horse and the extreme stresses of running and stopping will damage the leading portion of the rubber layer with the propagation of this damage to the remaining of the horseshoe occurring in period of time remarkably short as compared with the embodiments of FIGS. 1–4.

The improvements of the present invention may be provided to any kind of horseshoe, either for sport horseshoe such as for horse racing, polo, etc. for safety forces, such as police and army forces, including for therapeutic uses. In effect, FIG. 8 illustrates another embodiment shown a typical U-shaped horseshoe 21 with legs 21l and 21r, wherein the rubber layer extends, at an upper surface 21 (the horseshoe is shown in an inverted position) of the horseshoe, from leg 21l to leg 21r of the U-shaped horseshoe, forming a membrane 23. When fixed onto the hoof of the horse, membrane 23 may retain several kind of therapeutic compounds or substances to treat the hoof in connection with many topical horse disorders.

The improvements of the invention may be provided to many horseshoe designs like the ones depicted in FIGS. 6 and 7. FIG. 6 shows a horseshoe 17 having a groove 18 running along the bottom surface of the U-shaped horseshoe legs. FIG. 7 shows a horseshoe 19 having, at the bottom surface thereof, four grooves 20, two at each leg of the horseshoe. Both embodiments of FIGS. 6, 7 have grooved bottom surface to improve the grip and adherence of the horseshoe to the floor.

According to another aspect of the invention a method for manufacturing the horseshoe is also provided, the method comprising the steps of providing a horseshoe and working at least one outer surface thereof, such as by treating the surface with a rust-removing agent and/or jets of glass particles or sand, to increase the superficial porosity thereof to form an adhering surface, covering said surface with an adherence promoting substance, such as a paint, inserting said horseshoe within a vulcanization die, injecting a rubber based compound within said die and vulcanizing said compound over at least said outer surface of the horseshoe, said vulcanization step being carried out for 5 to 50 minutes at a temperature of 100 to 150° C., preferably for 20 minutes at 150°, and letting the horseshoe with the rubber compound to cool.

We claim:

1. A horseshoe with improved adherence and resilient properties, comprising:

a horseshoe core piece having an upper surface to be attached to the horse hoof, a bottom surface to be in contact with the ground and side surfaces connecting said upper and bottom surfaces, wherein said core piece has a leading sector having a step projecting downwardly from the bottom surface, the step defining a lower-most leading surface, and a layer of a rubber compound covering all of said surfaces with the layer covering said lowermost leading surface defining a thin film cover on said lowermost leading surface capable of being torn out during the use of the horseshoe without the tearing out of the thin film cover being propagated out of this horseshoe leading sector, said rubber layer having uniform thickness in forming the upper surface of the horseshoe.

2. A horseshoe according to claim 1, wherein said step projecting from said bottom surface comprises an insert fixed to the bottom surface of said core piece.

3. A horseshoe according to claim 1, wherein the core piece is of metal.

4. A horseshoe according to claim 1, wherein said step core piece is a curved generally U-shaped piece and said rubber layer extends from leg to leg of the U whereby a membrane portion is defined.

5. A horseshoe according to claim 1 wherein said rubber layer is substantially flat at the lower surface of the horseshoe.

6. A horseshoe with improved adherence and resilient properties, comprising:

a horseshoe core piece having an upper surface to be attached to the horse hoof, a bottom surface to be in contact with the ground and side surfaces connecting said upper and bottom surfaces, said surfaces being covered by a layer comprising a rubber compound, wherein the leading sector of said core piece is downwardly offset to form a transverse U-shape leading sector and wherein the upper surface of said leading sector forms a recess and the lowermost leading surface is defined in the bottom surface of said U-shape sector.

7. A horseshoe according to claim 6, wherein said rubber layer substantially completely fills the recess of said leading sector to make the entire upper surface of the horseshoe substantially flat.

8. A horseshoe according to claim 6, further comprising an insert in said recess substantially completely filling said recess.

* * * * *